United States Patent [19]

Endo

[11] Patent Number: 4,813,337
[45] Date of Patent: Mar. 21, 1989

[54] TANDEM PNEUMATIC PRESSURE BOOSTER

[75] Inventor: Mitsuhiro Endo, Kanagawa, Japan
[73] Assignee: Tokico Ltd., Kanagawa, Japan
[21] Appl. No.: 124,957
[22] Filed: Nov. 18, 1987
[30] Foreign Application Priority Data Nov. 20, 1986 [JP] Japan ................................ 61-178412

[51] Int. Cl.$^4$ ............................................. F15B 9/10
[52] U.S. Cl. .................... 91/369.2; 91/376 R; 92/48
[58] Field of Search ................... 92/48, 49; 91/369 A, 91/376 R, 369.1, 369.3, 369.4

[56] References Cited

U.S. PATENT DOCUMENTS

| | | | |
|---|---|---|---|
| 3,603,208 | 9/1971 | Kytta ................................. | 91/376 R |
| 4,512,237 | 4/1985 | Endoh et al. ................. | 91/376 R X |
| 4,535,680 | 8/1985 | Takayama et al. ........... | 91/369 A X |
| 4,587,884 | 5/1986 | Tsubouchi ..................... | 91/376 R X |
| 4,658,704 | 4/1987 | Mori et al. ..................... | 91/376 R X |
| 4,718,328 | 1/1988 | Mori et al. ..................... | 92/48 X |

FOREIGN PATENT DOCUMENTS 60-124372 8/1985 Japan .

Primary Examiner—Robert E. Garrett
Assistant Examiner—Mark A. Williamson
Attorney, Agent, or Firm—Wenderoth, Lind & Ponack

[57] ABSTRACT

A tandem pneumatic pressure booster in a braking apparatus for a motor vehicle, comprising a housing; front and rear movable walls; a center plate; the housing being hermetically closed by front and rear shells; front and rear variable pressure chambers; front and rear referential pressure chambers; a valve body having a control valve therein; a reaction disc containing case; a cylindrical passage member adapted to fit over the barrel of said case; the front movable wall being fixed to the case-passage member assembly, said passage member being provided with a referential pressure chamber communicating passage; and a variable pressure chamber communicating passage, whereby these parts may be formed into a configuration suitable for die casting and for improving mass productivity without deteriorating the differential pressure.

1 Claim, 4 Drawing Sheets

TANDEM PNEUMATIC PRESSURE BOOSTER

FIELD OF THE INVENTION

This invention relates to an improvement of a tandem pneumatic pressure booster used in a braking apparatus for a motor vehicle.

DESCRIPTION OF THE PRIOR ART

A motor vehicle comprises various types of combinations of parts. For improvement of the performance of the motor vehicle, the car body is inevitably required to be reduced in weight. For this reason, account is taken of potential reductions in weight of even individual parts, however small they may be.

Furthermore, it is important for the safety of a motor vehicle to be protected. Among others, the braking apparatus is an extremely important component in providing safety when a vehicle is driven.

A known tandem pneumatic pressure booster will be explained with reference to FIG. 1.

A housing which is hermetically closed by way of front and rear shells 1, 2 is divided by a front movable wall 3, a center plate 3', and a rear movable wall 4 into a front reference pressure chamber A, a front variable pressure chamber B, a rear reference pressure chamber C and a rear variable pressure chamber D. The front reference pressure chamber A is in communication with a reference pressure source such as, for example, an intake manifold of the engine, which acts as a vacuum source, whereas the front and rear reference pressure chambers A, C are adapted to communicate with each other by means of a communicating passage 11 and are kept at the same pressure (vacuum pressure).

On the other hand, the front and rear variable pressure chambers B and D communicate with each other by means of another communicating passage 12 formed in a passage member 5 and are kept at the same pressure.

Although the booster shown in FIG. 1 is shown in a non-communicating condition with respect to the vacuum source, a control valve 10 contacts the valve seats of a valve body 7 and a plunger 9 such as to close them when the booster communicates with the vacuum source. The control valve 10 is adapted to be opened and closed with respect to the valve seat surface by the working of a brake pedal. In other words, the first communicating passage 11 is isolated from atmospheric pressure by means of a control valve 10 whereas the second communicating passage 12 is opened and closed with respect to atmospheric pressure.

An operating rod 14 is urged leftward by working the brake pedal. This depresses a reaction disc 8 with the plunger 9, thereby separating the control valve 10 from the valve seat of the plunger 9. This closes the communicating passage 11' so as to isolate the variable pressure chambers B, D from the reference pressure source, whereas the seat of the plunger 9 is opened so as to allow the rear variable pressure chamber D to communicate with atmospheric pressure at the same time as the front variable pressure chamber B is caused to communicate with atmospheric pressure by means of the communicating passage 12. Thus, atmospheric pressure acts on the front and rear variable pressure chambers B, D so that the front and rear movable walls 3, 4 may be moved leftward by the differential pressure provided between the front reference pressure chamber A (vacuum pressure) and the front variable pressure chamber B (atmospheric pressure) and by the differential pressure between the rear reference pressure chamber C and the rear variable pressure chamber D. This differential pressure boosts the urging force of a booster piston rod 15. The boosted urging force of the booster piston rod 15 is transmitted to a master cylinder (not shown).

For example, the conventional tandem pneumatic pressure booster shown in Japanese Utility Model Public Disclosure No. 124372/85 is so arranged that a tip end 6a of a reaction disc containing case 6 engages with a valve body 7 so as to clamp the front movable wall 3 between the case 6 and a nut 16, thereby securing the passage member 5 and the case 6 to the valve body.

The rear movable wall 4 is clamped in a nip portion 13 between the passage member 5 and the valve body 7.

The disadvantage of the conventional pneumatic pressure booster is that a load is applied to the tip end or abutment 6a of the reaction disc containing case 6 held against the valve body 7 when the case 6 and the passage member 5 are secured to the valve body 7 so that the apparatus needs to be made dimensionally accurate and highly dependable by using parts formed of rigid material and machining and grinding those parts. This results in lowered productivity. Difficulty is involved in assembling such parts as the reaction disc containing case 6, passage member 5, the front movable wall 3, and the rear movable wall since they should be simultaneously tightened by way of a nut in an assembled condition.

In addition, differential pressure generated between the rear reference pressure chamber and the rear variable pressure chamber acts on the passage member 5 so that the passage member 5 needs to be made of a rigid material which provides sufficient strength to resist such a load.

SUMMARY OF THE INVENTION

It is an object of the present invention to eliminate the aforementioned defects and to provide a tandem pneumatic pressure booster of a type that includes a rear movable wall, a center plate and a front movable wall for dividing the interior of a housing hermetically closed by a front shell and a rear shell into four chambers such as a rear variable pressure chamber, a rear reference pressure chamber, a front variable pressure chamber and a front reference pressure chamber, and a valve body incorporating a control valve therein and adapted to be operated to provide output, characterized in that the booster further includes a reaction disc containing case for accommodating a reaction disc, said rear movable wall being clamped between a flange of said case and said valve body, a cylindrical passage member adapted to fit over the barrel of said reaction disc containing case on the outer periphery thereof and to be secured to the case, said front movable wall being fixed to the case-passage member assembly consisting of said case and passage member, said passage member being provided with a reference pressure chamber communicating passage in communication with said rear and front reference pressure chambers and a variable pressure chamber communicating passage in communication with said rear and front variable pressure chambers.

It is another object of the invention to provide the above-fabricated booster which is capable of having the reaction disc containing case subjected to differential pressure generated between the rear reference pressure chamber and the rear variable pressure chamber and acting on the rear movable wall, thus preventing the differential pressure from being applied to the passage member.

This avoids problems related to the strength of the passage member and minimizes its weight. The rear movable wall is positively clamped between the flange of the reaction disc containing case and the valve body.

It is a further object of the invention to provide a tandem pneumatic pressure booster which is so arranged that the reaction disc containing case is provided in such a manner that the rear movable wall is tightened and clamped by means of bolts and the like between the flange of the case and the valve body having stably supported on the rear shell, and that the passage member is disposed so as to fit over the barrel of the case supported stably and is adapted to support the front movable wall and be secured to the case so that the reaction disc containing case and the passage member may be brought into such a condition that they are substantially, firmly supported by the rear shell, thereby horizontally maintaining the case and the passage in a stable manner.

As a result, the front and rear walls are prevented from being subjected to unreasonable stress which gives the apparatus good longevity and secures a positive sealing of the portions to be sealed without deteriorating the differential pressure. Consequently, lightweight material may be used so that the tandem pneumatic booster can be made light and its safety improved.

According to the present invention, the apparatus is so fabricated that the reaction disc containing case is secured to the valve body by means of the bolts, and the passage member is fitted over the barrel of the case so that these parts may be formed into a configuration suitable for die casting and for improving mass productivity.

BRIEF DESCRIPTION OF THE DRAWINGS

The features of this invention will be more fully apparent from the following description of an embodiment of this invention taken in conjunction with the accompanying drawings, in which:

FIG. 2 is a longitudinal section of a tandem pneumatic pressure booster according to the present invention;

FIG. 3 is a longitudinal section of a passage member;

FIG. 4 is a side view of the same as viewed from the right of FIG. 3;

FIG. 5 is a section taken along the line A—A in FIG. 4;

FIG. 6 is a longitudinal section of a reaction disc containing case;

FIG. 7 is a side view of the same as viewed from the right of FIG. 6; and

FIG. 8 is a plan view of a packing member.

DETAILED DESCRIPTION OF THE PREFERRED EMBODIMENT

Figure 1:
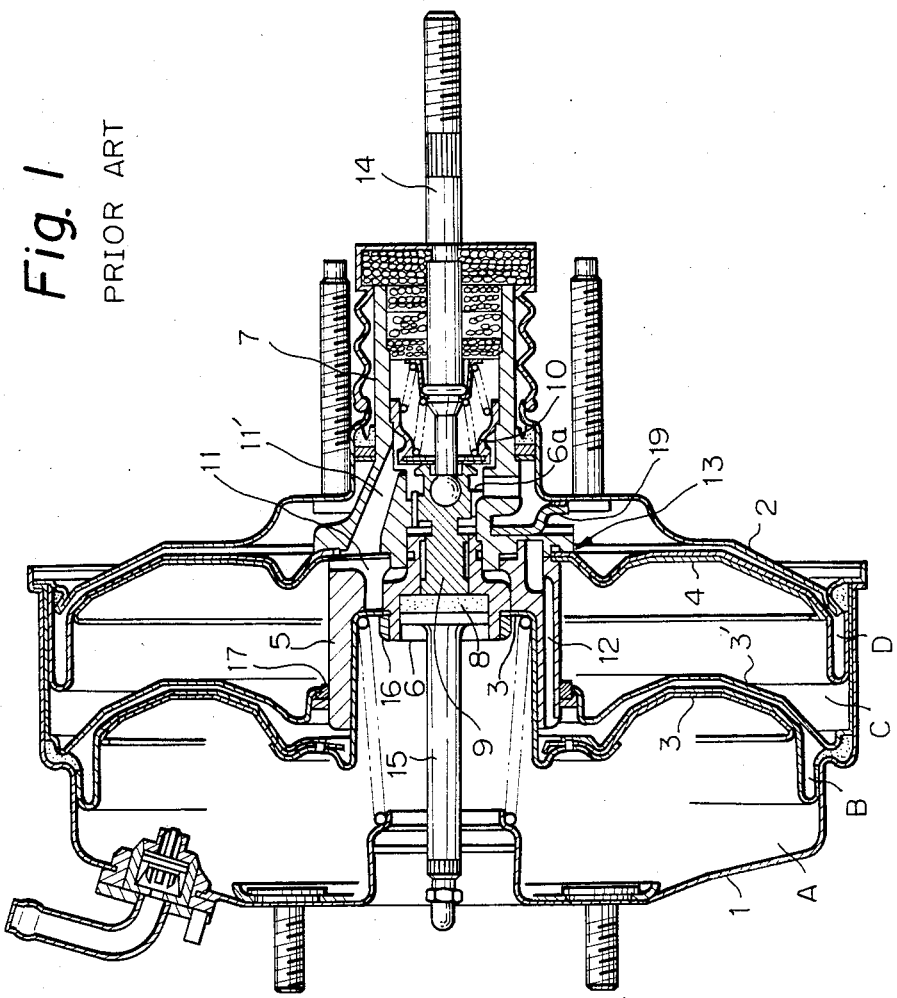
FIG. 1 is a longitudinal section of a conventional tandem pneumatic pressure booster.
Figure 2:
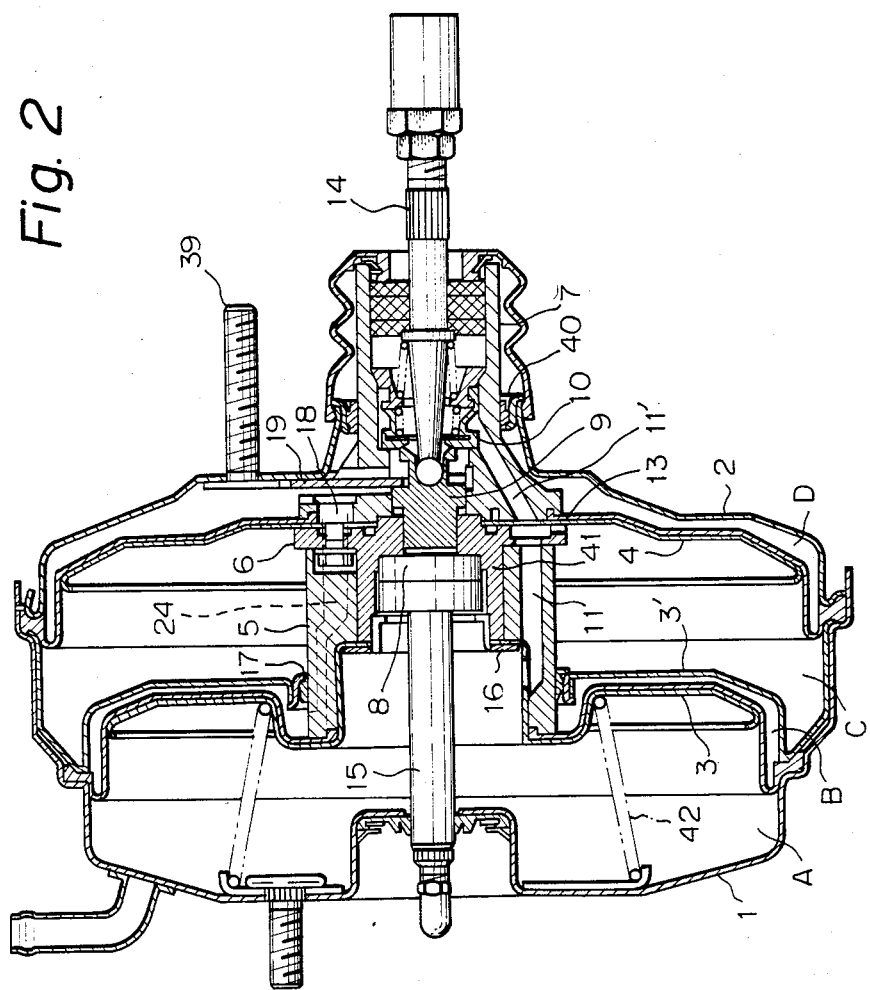
FIGS. 2-8 show one embodiment of the present invention.

Referring now to the drawings, wherein like reference characters designate like or corresponding parts through the several views, particularly to FIG. 2, a housing which is hermetically closed by front and rear shells 1, 2 is divided by a front movable wall 3, center plate 3', and a rear movable wall 4 into a front reference pressure chamber A, a front variable pressure chamber B, a rear reference pressure chamber C and a rear variable pressure chamber D.

The booster is held in position as a whole by bolting the rear shell 2 to a body frame (not shown).

A valve body 7 which incorporates a control valve 10 is supported on the rear shell 2 within a slide member 40. Number 6 designates a reaction disc containing case which is secured to the valve body 7 by means of a bolt 18 that passes through the rear movable wall 4 held therebetween. This allows the valve body 7 to support the case 6 and the wall 4 on the rear shell 2.

Figure 6:
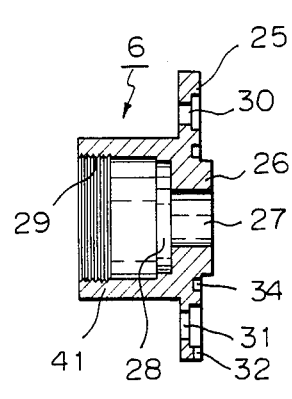
Figure 7:
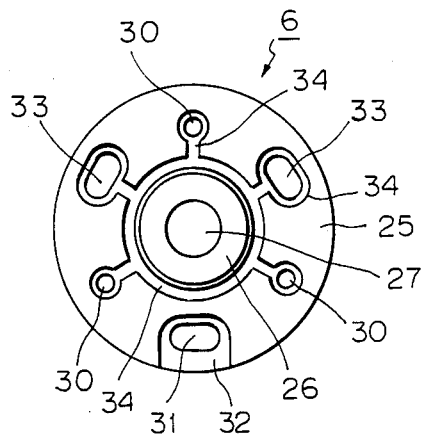

The reaction disc containing case 6, as shown in FIGS. 6 and 7, is provided with the flange 25 which is also provided with three holes 30 for the bolts, two variable pressure chamber communicating ports 33, a reference pressure chamber communicating ports 31, and a notch 32. Numerals 27, 28, 29 and 41 designate a plunger inserting hole, reaction disc containing section, thread and a barrel, respectively.

In FIG. 2, numerals 8, 9 and 5 designate a reaction disc, plunger and a passage member, respectively. The passage member 5 is fitted over the barrel 41 of the reaction disc containing case 6 and is secured by means of a screw member 16 to the containing case 6 in such a manner that the front movable wall 3 extends along the one end and the inner peripheral wall of the case 6. The inner circumference of the front movable wall 3 is also secured to the case 6 by the screw 16. The inner circumference of the front movable wall may be secured to the passage member 5. The passage member 5 and the reaction disc containing case constitute a case-passage member assembly.

Figure 3:
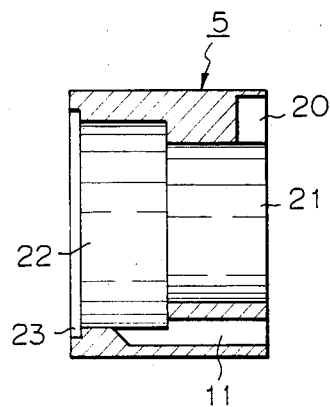
Figure 4:
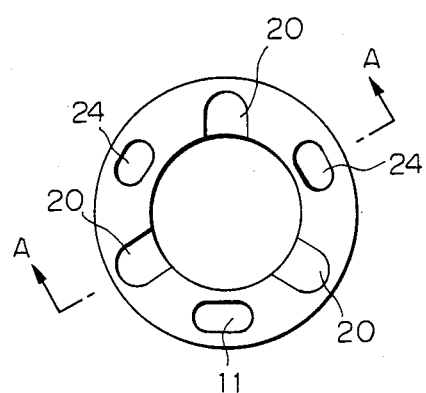
Figure 5:
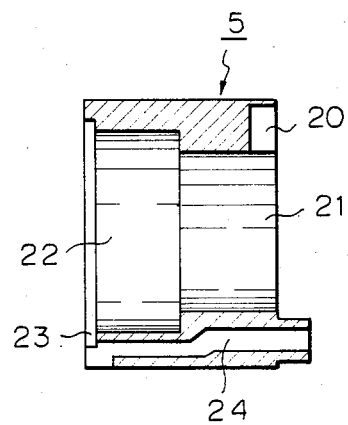

As shown in FIGS. 3, 4 and 5, the passage member 5 is provided with three nut receiving holes 20, two variable pressure chamber communicating passages 24 and a reference pressure chamber communicating passage 11 which opens through front movable wall 3 into chamber A.

Numerals 21, 22 and 23 designate a fitting hole through which the barrel 41 of the case 6 passes, a hole for receiving the front movable wall, and an annular recess for receiving the inner periphery of a diaphragm as a part of the front movable wall. The passage member 5 is an alumina diecast product or is formed of synthetic resin and the like. Numerals 14, 15 and 19 are an operating rod, booster piston rod, and a stopper key for defining the position to which the plunger 9 is returned.

Figure 8:
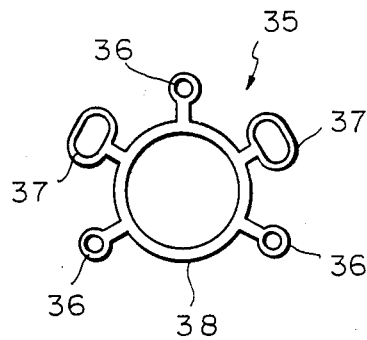

FIG. 8 shows a seal member 35 which is integrally formed of a first means 36 for sealing the circumference of the three bolts 18, seal means 37 for sealing the circumference of the variable pressure chamber communicating hole, and a means 38 for sealing the boundary between the reaction disc containing case 6 and the valve body 7. The seal member 35 is positioned in a continuous recess 34 (FIG. 7) which extends around the circumferences of the bolt holes 30 in the case 6, the variable pressure chamber communicating ports 33 and a central recess 34.

The operation of the embodiment as above arranged will be apparent from the following description.

Referring to FIG. 2, the rear movable wall 4 is firmly held in position by the bolt 18 between the flange 25 of the case 6 and the valve body 7. A projection 26 (FIG. 6) of the case 6 is fitted into a recess in the valve body 7 for positioning purposes so that the case 6 and the rear movable wall 4 are firmly supported substantially on the rear shell 2 by means of the valve body 7. The passage member 5 is fitted over the barrel 41 of the case 6 and is stably supported without displaying any inclination. Similarly, the front movable wall 3 mounted on the passage member 5 is stably supported.

Now, depression of the brake pedal urges the operating rod 14 leftward to allow the control valve 10 to open the valve seat of the plunger 9 so that the rear variable pressure chamber D will communicate with atmospheric pressure whereas the front variable pressure chamber B is subjected to atmospheric pressure by means of the variable pressure chamber communicating passage 24. Consequently, differential pressure between the chambers A and B and between the chambers C and D advances the valve body 7, reaction disc containing case 6, passage member 5, and the rear and front movable walls 4 and 3 leftward (forward), thereby causing the booster piston rod 15 to provide output.

Although the variable pressure chamber communicating passage 24 is shown by the dotted line as aligning with the bolt 18, it is actually spaced away from the bolt 18 circumferentially, as shown in FIG. 4.

During the aforementioned operation, the reaction disc containing case 6 and the passage member 5 are moved along the centers of axes of the operating rod 14 and the booster piston rod 15 without undergoing any inclination so that the rear movable wall 4 and the case may be smoothly moved.

The sealing means 17 may be positively slid without deteriorating the sealing condition since the passage member 5 is not inclined.

Due to the fact that the passage member 5 is not inclined, the passage member 5 is prevented from being subjected to any unreasonable force, and it is enough for the passage member 5 to support the load of the front movable wall 3.

What is claimed is:

1. A tandem pneumatic pressure booster of a type that includes a rear movable wall, a center plate and a front movable wall for dividing the interior of a housing hermetically closed by a front shell and a rear shell into a rear variable pressure chamber, a rear reference pressure chamber, a front variable pressure chamber and a front reference pressure chamber, and a valve body incorporating a control valve therein and adapted to be operated to provide output, characterized in that the booster further includes a reaction disc containing case for accommodating a reaction disc, said reaction disc containing case having a flange clamping said rear movable wall to said valve body, said reaction disc containing case further having a barrel portion, said front movable wall being fixed to said case, a cylindrical passage member fitting over the outer peripheral surface of said barrel portion between said flange and said front movable wall and fitting between said flange and said front movable wall with a fit for avoiding receiving pressure applied to said flange or to said front movable wall, said passage member being provided with a reference pressure chamber communicating passage in communication with said rear and front reference pressure chambers and a variable pressure chamber communicating passage in communication with said rear and front variable pressure chambers.

* * * * *